United States Patent
Vogt

(10) Patent No.: US 10,309,450 B2
(45) Date of Patent: Jun. 4, 2019

(54) FOIL BEARING, METHOD FOR SETTING A GAP GEOMETRY OF A FOIL BEARING, AND CORRESPONDING PRODUCTION METHOD OF A FOIL BEARING

(71) Applicant: Robert Bosch GmbH, Stuttgart (DE)

(72) Inventor: Andreas Vogt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 15/538,142

(22) PCT Filed: Dec. 8, 2015

(86) PCT No.: PCT/EP2015/078950
§ 371 (c)(1),
(2) Date: Jun. 20, 2017

(87) PCT Pub. No.: WO2016/102182
PCT Pub. Date: Jun. 30, 2016

(65) Prior Publication Data
US 2017/0343041 A1 Nov. 30, 2017

(30) Foreign Application Priority Data
Dec. 22, 2014 (DE) .................. 10 2014 226 840

(51) Int. Cl.
 *F16C 17/02* (2006.01)
 *F16C 25/02* (2006.01)
 *F16C 27/02* (2006.01)

(52) U.S. Cl.
 CPC ............ *F16C 17/024* (2013.01); *F16C 25/02* (2013.01); *F16C 27/02* (2013.01)

(58) Field of Classification Search
 CPC .................................................. F16C 17/024
 See application file for complete search history.

(56) References Cited

U.S. PATENT DOCUMENTS 4,445,792 A * 5/1984 Trippett ................ F16C 17/024
 384/103
4,815,864 A * 3/1989 Jones .................... F16C 17/024
 384/103

(Continued)

FOREIGN PATENT DOCUMENTS

CN 103649572 A 3/2014
CN 103842671 A 6/2014

(Continued)

OTHER PUBLICATIONS

International Search Report corresponding to PCT Application No. PCT/EP2015/078950, dated Jan. 26, 2016 German and English language document) (7 pages).

*Primary Examiner* — Thomas R Hannon
(74) *Attorney, Agent, or Firm* — Maginot, Moore & Beck LLP

(57) ABSTRACT

A foil bearing includes a bearing back, a foil arrangement, and a setting mechanism. The bearing back includes a passage opening configured to receive a shaft, such that a gap is formed between the shaft and the bearing back. The foil arrangement defines a first inner circumference and includes a first segment-shaped foil arranged in the gap adjacent to the bearing back, a second segment-shaped foil arranged in the gap adjacent to the first segment-shaped foil, and a third segment-shaped foil arranged in the gap between the shaft and the second segment-shaped foil. The setting mechanism is configured to set the first inner circumference.

13 Claims, 3 Drawing Sheets

(56) References Cited

U.S. PATENT DOCUMENTS

| | | | |
|---|---|---|---|
| 6,024,491 A | 2/2000 | Bak | |
| 6,848,828 B2 * | 2/2005 | Nishijima | B05B 5/0415 384/103 |
| 9,394,941 B2 * | 7/2016 | Ryu | F16C 17/10 |
| 9,976,595 B2 * | 5/2018 | Kim | F16C 32/0622 |
| 2003/0118257 A1 | 6/2003 | Lee et al. | |
| 2004/0042691 A1 | 3/2004 | Matsunaga | |
| 2008/0310778 A1 * | 12/2008 | Lee | F16C 17/024 384/100 |
| 2015/0362012 A1 | 12/2015 | Ermilov | |

FOREIGN PATENT DOCUMENTS

| | | |
|---|---|---|
| CN | 104653598 A | 5/2015 |
| EP | 2 949 952 A1 | 12/2015 |
| JP | 2003-21137 A | 1/2003 |
| JP | 2003-262222 A | 9/2003 |
| RU | 2012 146 614 A | 5/2014 |
| RU | 2013 148 493 A | 5/2015 |
| WO | 2014/070046 A1 | 5/2014 |
| WO | 2015/070046 A1 | 5/2015 |

\* cited by examiner

FOIL BEARING, METHOD FOR SETTING A GAP GEOMETRY OF A FOIL BEARING, AND CORRESPONDING PRODUCTION METHOD OF A FOIL BEARING

This application is a 35 U.S.C. § 371 National Stage Application of PCT/EP2015/078950, filed on Dec. 8, 2015, which claims the benefit of priority to Serial No. DE 10 2014 226 840.0, filed on Dec. 22, 2014in Germany, the disclosures of which are incorporated herein by reference in their entirety.

The disclosure relates to a foil bearing, to a method for setting a gap geometry of a foil bearing, and to a corresponding production method of a foil bearing.

BACKGROUND

Foil bearings are used in a multiplicity of applications, particularly in high-speed applications, for example in thermal flow machines, turbochargers, compressors, etc.

Foil bearings are a special type of plain bearings. They are aerodynamic bearings which are designed for high rotational speeds. Foil bearings of the first generation consist of what is referred to as the top foil, the bump foil and the bearing back. In order to improve the stability of a shaft in said bearing back, a plurality of, typically three, prestressing elements (for example material strips with a rectangular cross section and the length of the bearing width, what are referred to as "shims") distributed over the circumference are placed between the bearing back and the bump foil. Without prestressing elements of this type, the aerodynamic buildup of pressure only takes place at a point is the circumferential direction of the shaft, namely where the shaft is caused by an external force to lie against the top foil. With the prestressing elements, by contrast, the buildup of pressure takes place at, for example, three points on the circumference.

FIG. 3 shows a schematic view for explaining an example of a foil bearing 300 without prestressing elements.

The foil bearing 300 has a bearing back 101, a shaft 103, a foil arrangement 107 with a top foil 107b and with a bump foil 107a. The foil arrangement 107 is arranged in a gap 303 between the shaft 103 and the bearing back 101. In FIG. 3, the shaft 103 lies against the top foil 107b only at one cross-sectional point. This gives rise to a gap 303 which narrows in the circumferential direction and in which the hydrodynamic or aerodynamic pressure can build up. The distribution of pressure in the foil bearing is sketched schematically with the curve 301.

FIG. 4 illustrates a further example of a foil bearing 400 with prestressing elements 401, 403, 405.

The foil bearing 400 has a bearing back 101, a shaft 103, a foil arrangement 407, 407', 407" each having a top foil 407b and a bump foil 407a. The foil arrangement 107 is arranged in a gap 409 between the shaft 103 and the bearing back 101. In order to stabilize the shaft, the prestressing elements 401, 403, 405 are additionally arranged in the gap.

It can be seen in FIG. 4 that, by means of the prestressing elements 401, 403, 405, narrowing gaps arise at a plurality of points over the bearing circumference between the shaft 103 and the top foil 407b. At each of said narrowing portion, an aerodynamic pressure builds up in each case, said aerodynamic pressure supporting the shaft and positioning the latter in the radial direction. The position and the height of the prestressing elements 401, 403, 405 define the geometry of the construction. However, after the foil arrangement 407, 407', 407" and the prestressing elements 401, 403, 405 are installed, the geometry of the bearing 400 can no longer be changed, the position and the strength of the pressure gradients are then only still dependent on the operating conditions (speed, viscosity of the medium and the temperature).

US 2004/0042691 A1 discloses a foil bearing with a plurality of foils which are in the shape of segments of a ring and are arranged in a gap between a shaft and a bearing back. The bearing back here is pierced by pins, wherein the length by which the pins project out of the bearing back can be set by a rotatable ring surrounding the bearing back.

US 2003/0118257 A1 shows a foil bearing with a multiplicity of piezoelectric actuators. The foil bearing comprises a housing and also a plurality of foils for supporting a rotating shaft. The piezoelectric actuators are designed to set the stiffness and the damping coefficient of the bearing.

SUMMARY

The disclosure provides a foil bearing, a method for setting a gap geometry of a foil bearing, and a corresponding production method of a foil bearing.

Preferred developments are the subject matter of the respective dependent claims.

The concept on which the present disclosure is based consists in placing what is referred to as a bottom foil in a foil bearing in addition to the previously used top and bump foils. Said bottom foil is arranged between the bearing back and the bump foil. Accordingly, a foil arrangement of a foil bearing according to the disclosure has a foil arrangement with a bottom foil, a supporting foil and a top foil.

In addition, the foil bearing has a setting mechanism with which an inner circumference of a foil arrangement can be set.

The setting mechanism here is suitable for appropriately elastically deforming the bottom foil. This results in a settable gap geometry.

The present disclosure therefore permits compensation of manufacturing tolerances in the production of foil bearings, due to which manufacturing tolerances the gap geometry of a foil bearing may vary. In this connection, a gap which is too small is disadvantageous for the efficiency of the bearing since this can lead to rubbing of the borders on the housing with subsequent breakdown of the flow machine. By contrast, too great a gap reduces the supporting force of the bearing. By means of the retrospective setting of the gap geometry, which setting is provided with the present disclosure, manufacturing tolerances can be corrected and in particular the shaft can be positioned in the radial direction.

According to a preferred development, the bearing back is provided with bores at one or more positions in the circumferential direction and/or in the axial direction. Inserted into these bores are screws which, depending on the screwing-depth, press the bottom foil, the bump foil and also the top foil to the center of the bearing. This configuration of the setting mechanism provides a particularly flexible embodiment of the setting mechanism that is easy to handle.

By the gap geometry between the shaft and the bearing being able to be set in a flexible manner, the supporting behavior of a foil bearing can therefore also be set flexibly.

According to a further preferred development, the setting direction has a first, second and/or third screw in the circumferential direction and/or in the axial direction, as a result of which the foil arrangement can be positioned in the axial and/or radial direction. Screws ensure a flexible possibility of setting the gap geometry of the foil bearing. However, screws are also advantageous in respect of their low production costs and also their simple operability for a user with commercially available tools.

According to a further preferred development, the bottom foil, the bump foil and the top foil are each designed as segment-shaped foils. A segment-shaped foils should be understood here as meaning a curved foil which forms at least part of a substantially annular element. The top foil has a first and second edge at a first and second end, wherein the first and the second edge enclose an angle of at least 340°, i.e. the top foil is of substantially encircling design and has an interruption of up to 20°. The angle specification of 340° relates here to the arc of the circle which has the top foil. The top foil and consequently also the foil arrangement are therefore merely of approximately annular design. The angle between the first edge and the second edge of the top foil ensures flexible deformability of the foil arrangement. However, if the angle between the first and the second edge becomes too small, this has a negative effect on the stability and the supporting force of the foils and the foil bearing. The angle mentioned thus constitutes an optimum compromise between the ability of the gap geometry to be set and the supporting force of the bearing. The bump foil can in particular also be interrupted at a plurality of points and does not have to have the same geometry as the top foil. For example, the bump foil can be designed in such a manner that it is divided into three segments in the circumferential direction. Depending on the number of bump foil segments, the latter are spaced apart from one another in such a manner that the distance between bump foil segments in the circumferential direction totals approx. 15°. For example, in the case of three bump foil segments, a distance of approx. 5°-10° will arise between each two bump foil segments. With such orders of magnitude, a flexible and independent deformability of the bump foil segments with respect to one another is ensured.

According to a further preferred development, the setting mechanism is at least partially arranged in the bearing back. The arrangement in the bearing back ensures easy accessibility for a user who can therefore easily set the gap geometry of a foil bearing according to the disclosure.

According to a further preferred development, the setting mechanism has a first end position and a second end position and can be set continually between the first and the second end position. The continual settability between the first and the second position ensures a flexible setting possibility which can be precisely adapted to the prevailing conditions.

According to a further preferred development, the third foil touches the shaft when the setting mechanism is in its second position. Accordingly, the second end position is designed as a stop and therefore a gap which is as small as desired can also be set between the shaft and the bearing back.

According to a further preferred development, the setting mechanism in its first position forces a first circumference with a first radius of the foil arrangement and in its second position forces a second circumference with a second radius of the foil arrangement, wherein the first circumference differs from the second circumference by a factor of 0.999. By means of this range of a possible forced circumference of the foil arrangement, a maximally possible range of the settable gap geometry is achieved. This corresponds, for example, to half a lubricating film height of a gas film in a foil bearing. In the case of a passage opening of a diameter of 15 mm with bearing play of approx. 20 µm, the gas film is approx. 5-10 µm.

According to a further preferred development, the second foil is designed as a metal fabric. By this means, the second foil can be deformed particularly flexibly.

BRIEF DESCRIPTION OF THE DRAWINGS

Further features and advantages of the present disclosure are explained below using embodiments with reference to the figures.

In the figures

DETAILED DESCRIPTION

The same reference signs denote identical or functionally identical elements in the figures.

Figure 1:
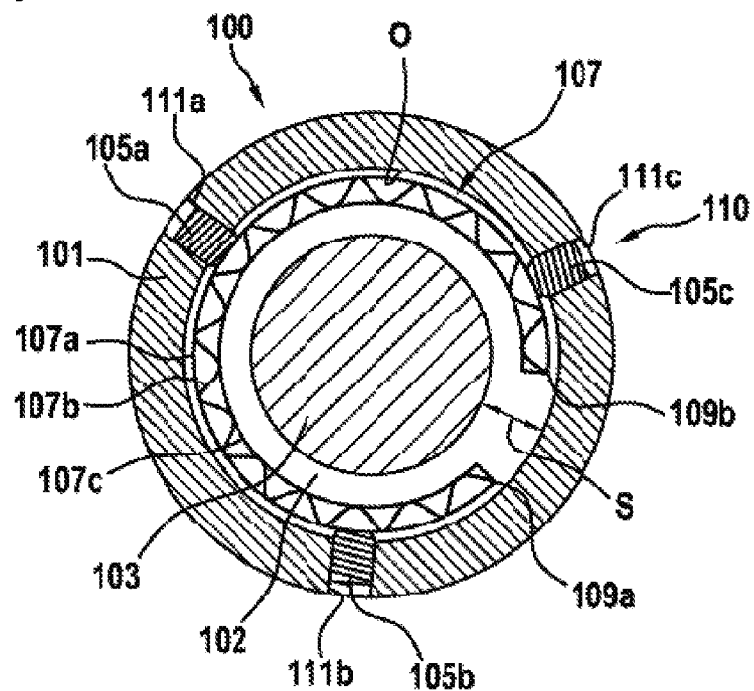
FIG. 1 shows a schematic cross-sectional view of a foil bearing according to an embodiment of the present disclosure.

FIG. 1 shows a schematic cross-sectional view of a foil bearing 100 according to an embodiment of the present disclosure.

The foil bearing 100 is bounded in this case by a bearing back 101. The setting mechanism 110 is arranged within the bearing back 101 and formed by screws 105a-c which are each arranged in a bore 111a-c. A passage opening 102 in which a shaft 103 is arranged centrally is formed within the bearing back. The shaft 103 is surrounded by a uniform gap S with a constant width in the circumferential direction. The foil arrangement 107 is formed within the gap, between an inner surface O of the bearing back 101 and the shaft 103. The foil arrangement 107 comprises three foils, a first foil 107a, a second foil 107b and a third foil 107c. The first foil 107a is designed here as the bottom foil, the second foil 107b as the bump foil and the third foil 107c as the top foil.

In this embodiment, the foils 107a-c are designed in the shape of segments of a cylinder. However, it should be noted that the foils 107a-c can also be of another shape without departing from the scope of protection of the disclosure. The foils 107a-c each have a first edge 109a and a second edge 109b. In the drawing, which is not true to scale, the edges 109a and 109b enclose an angle of 320° or 40°. That is to say that the foils encircle an angle of 320° of a full circle and that foils are not arranged in the remaining region of 40°. In practice, an angle of approx. 345° would generally result.

FIG. 1 shows the setting mechanism 110 and the screws 105a-c in a first position in which the screws 105a-c end flush with the inner surface of the bearing back. The foils 107a-c therefore lie against the inner surface O of the bearing back 101, and a gap S of maximum width is set by the setting mechanism 110 and/or by the screws 105a-c.

Figure 2:
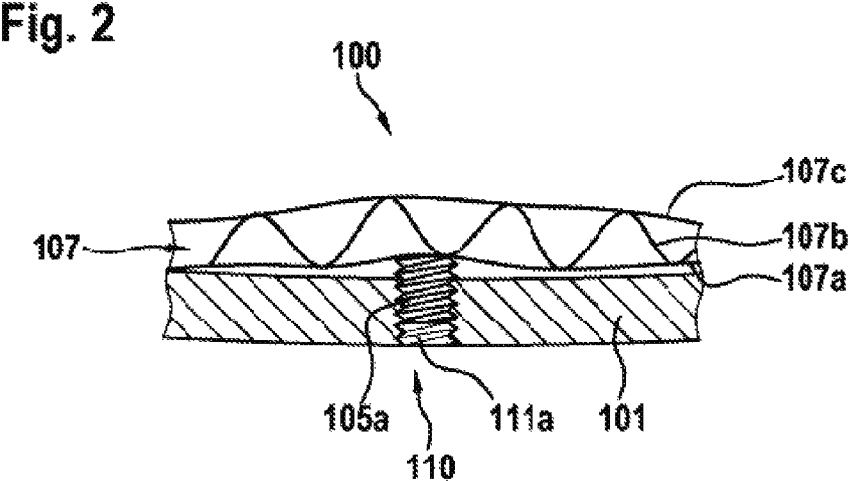
FIG. 2 shows a schematic cross-sectional partial view of FIG. 1.
Figure 3:
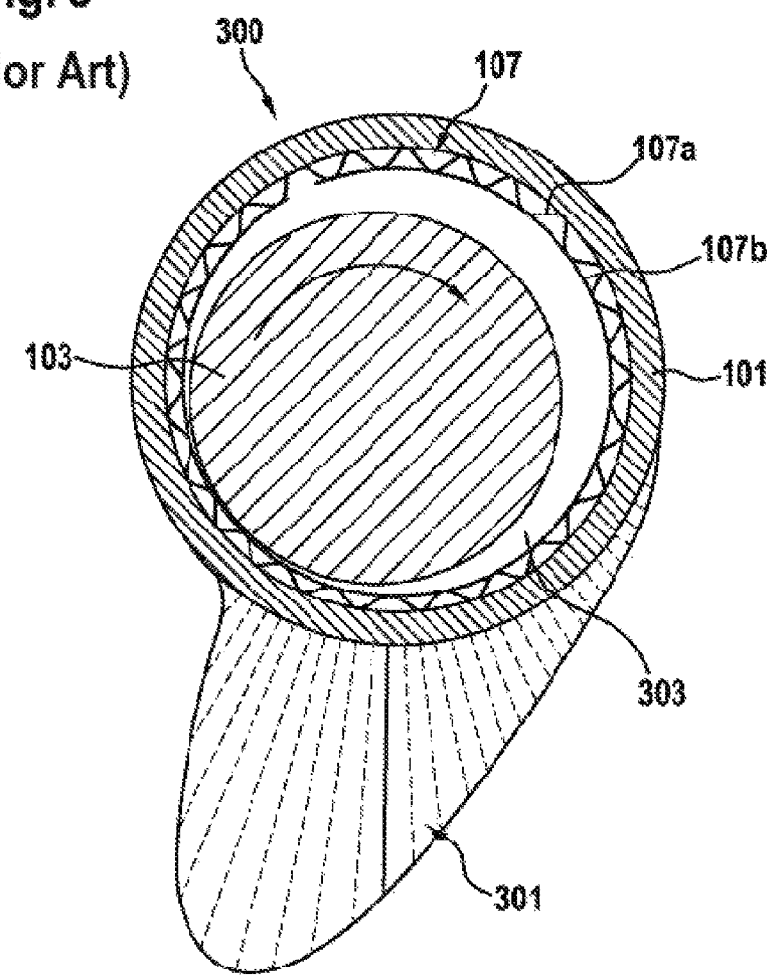
FIG. 3 shows a schematic cross-sectional view of an example of a foil bearing.
Figure 4:
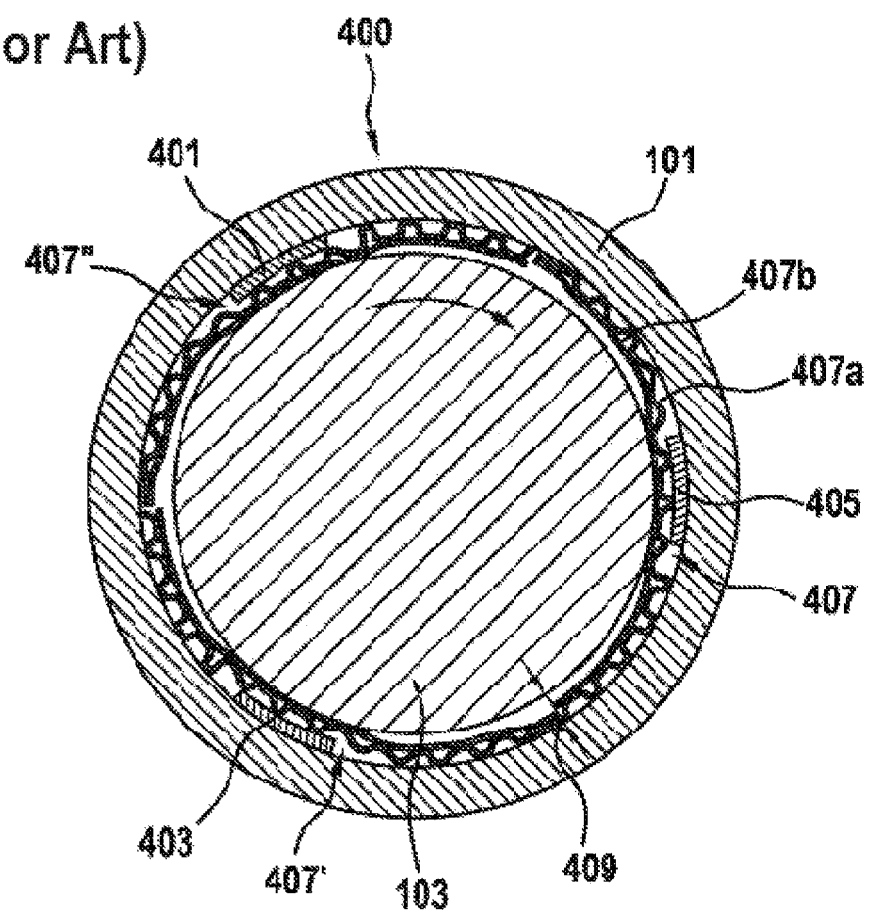
FIG. 4 shows a schematic cross-sectional view of an example of a foil bearing.

FIG. 2 shows a schematic cross-sectional view of a cutout of a foil bearing 100 according to FIG. 1.

In FIG. 2, the setting mechanism 110 is formed by a screw 105a. FIG. 2 shows the screw 105a in a further position which differs from the first position according to FIG. 1. The screw 105a here is screwed deeper into the bore 111a of the bearing back 101, and therefore the screw no longer ends flush with the inner surface of the bearing back 101, but rather protrudes from said inner surface. The foil arrangement 107 is therefore pushed away from the inner surface O of the bearing back 101 by the screw 105a. Accordingly, smaller circumference of the foil arrangement 107 is forced.

Although the present disclosure has been described with reference to preferred exemplary embodiments, it is not restricted thereto. In particular, the materials and topologies mentioned are merely by way of example and are not restricted to the explanatory examples.

The design of the foil bearing is not restricted to the above-described embodiments, but rather can be adapted as desired to the particular application. For example, the number of screws of a setting mechanism can be adapted to the prevailing conditions. Furthermore, the shape of the foil bearing, of the bearing back, of the foil arrangement and of the shaft is not restricted to the cylinder shape illustrated.

The disclosure can be used in all foil bearings, the construction of which includes a bump foil and a top foil. In addition, the disclosure can also be used in what are referred to as mesh foil bearings. In the case of a mesh foil bearing, the bump foil is replaced by a metal fleece.

The invention claimed is:

1. A foil bearing, comprising:
   a bearing back including a passage opening configured to receive a shaft, such that a gap is formed between the shaft and the bearing back;
   a foil arrangement defining a first inner circumference and including:
     a first segment-shaped foil arranged in the gap adjacent to the bearing back,
     a second segment-shaped foil arranged in the gap adjacent to the first segment-shaped foil, and
     a third segment-shaped foil arranged in the gap between the shaft and the second segment-shaped foil; and
   a setting mechanism configured to set the first inner circumference.

2. The foil bearing as claimed in claim 1, wherein the setting mechanism includes a first screw enabling the foil arrangement to be positioned in a radial direction.

3. The foil bearing as claimed in claim 2, wherein the setting mechanism further includes a second screw.

4. The foil bearing as claimed in claim 3, wherein the setting mechanism further includes a third screw.

5. The foil bearing as claimed in claim 1, wherein the third segment-shaped foil encloses at least 340° between a first edge at a first end of the third segment-shaped foil and a second edge at a second end of the third segment-shaped foil.

6. The foil bearing as claimed in claim 1, wherein the setting mechanism is at least partially arranged in the bearing back.

7. The foil bearing as claimed in claim 1, wherein the setting mechanism includes a first end position and a second end position, and is configured to be continually adjusted between the first end position and the second end position.

8. The foil bearing as claimed in claim 7, wherein the third segment-shaped foil touches the shaft when the setting mechanism is in the second end position.

9. The foil bearing as claimed in claim 7, wherein:
   when the setting mechanism is in the second end position, the setting mechanism forces a second circumference of the foil arrangement;
   the second circumference is different from the first inner circumference; and
   the second circumference is reduced by a factor of 0.999 in relation to the first inner circumference when the setting mechanism is in the first end position.

10. The foil bearing as claimed in claim 1, wherein the second segment-shaped foil is configured as a metal fabric.

11. A method for setting a gap geometry of a foil bearing, the foil bearing including a bearing back, a foil arrangement, and a setting mechanism, the method comprising:
   determining an operating state and/or a rotational speed of a shaft mounted in a passage opening of the bearing back so as to form a gap geometry between the shaft and the bearing back;
   determining a suitable setting of the gap geometry using the determined operating state and/or the rotational speed; and
   positioning the setting mechanism so as to adjust the determined gap geometry,
   wherein the foil arrangement defines a first inner circumference and includes a first segment-shaped foil arranged in the gap geometry adjacent to the bearing back, a second segment-shaped foil arranged in the gap geometry adjacent to the first segment-shaped foil, and a third segment-shaped foil arranged in the gap geometry between the shaft and the second segment-shaped foil.

12. The method as claimed in claim 11, further comprising:
   setting the first inner circumference with the setting mechanism.

13. A method of forming a foil bearing, comprising:
   arranging first, second, and third segment-shaped foils within a cavity defined by a bearing back to form a foil arrangement that defines a first inner circumference, the cavity configured to receive a shaft such that a gap is formed between the shaft and the bearing back, the segment-shaped foils arranged in the gap such that:
     the first segment-shaped foil is adjacent to the bearing back,
     the second segment-shaped foil is adjacent to the first segment-shaped foil, and
     the third segment-shaped foil is between the shaft and the second segment-shaped foil; and
   arranging a setting mechanism within the bearing back, the setting mechanism configured to set the first inner circumference.

* * * * *